(12) United States Patent
O'Mahony

(10) Patent No.: US 9,307,188 B2
(45) Date of Patent: Apr. 5, 2016

(54) METHOD OF AND APPARATUS FOR PERFORMING AN OBJECTIVE VIDEO QUALITY ASSESSMENT USING NON-INTRUSIVE VIDEO FRAME TRACKING

(75) Inventor: Barry A. O'Mahony, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 246 days.

(21) Appl. No.: 13/993,580

(22) PCT Filed: Dec. 28, 2011

(86) PCT No.: PCT/US2011/067570
§ 371 (c)(1),
(2), (4) Date: Jun. 12, 2013

(87) PCT Pub. No.: WO2013/100960
PCT Pub. Date: Jul. 4, 2013

(65) Prior Publication Data
US 2014/0002735 A1    Jan. 2, 2014

(51) Int. Cl.
*G06K 9/00* (2006.01)
*H04N 7/081* (2006.01)
*H04N 21/8358* (2011.01)
*H04N 21/2343* (2011.01)
*H04N 21/2662* (2011.01)
*H04N 21/414* (2011.01)
*H04N 21/44* (2011.01)
(Continued)

(52) U.S. Cl.
CPC ........... *H04N 7/081* (2013.01); *H04N 21/2343* (2013.01); *H04N 21/2662* (2013.01); *H04N 21/41407* (2013.01); *H04N 21/44004* (2013.01); *H04N 21/44008* (2013.01); *H04N 21/6112* (2013.01); *H04N 21/6379* (2013.01); *H04N 21/8358* (2013.01)

(58) Field of Classification Search
None
See application file for complete search history.

(56) References Cited

U.S. PATENT DOCUMENTS

2002/0191810 A1   12/2002   Fudge et al.
2008/0089552 A1*   4/2008   Nakamura et al. ............ 382/100
(Continued)

FOREIGN PATENT DOCUMENTS

EP    1 585 348 A1   10/2005
JP    2001231017 A   8/2001
(Continued)

OTHER PUBLICATIONS

"PCT Notification of Transmittal of the International Search Report and the Written Opinion of the International Searching Authority, or the Declaration", dated Sep. 19, 2012, for International Application No. PCT/US2011/067570, 15pgs.
(Continued)

*Primary Examiner* — Shefali Goradia
(74) *Attorney, Agent, or Firm* — Buckley, Maschoff & Talwalkar LLC

(57) ABSTRACT

An article of manufacture includes a computer readable medium having stored thereon instructions which, when executed by a processor, cause the processor to receive a formatted video signal, decode the formatted video signal into one or more watermarked images, perform watermark decoding of one of the one or more watermarked images to retrieve a frame sequence number and perform video quality assessment based, at least in part, upon the frame sequence number and perform parameter optimization based, at least in part, upon a result of the video quality assessment.

19 Claims, 6 Drawing Sheets

(51) Int. Cl.
*H04N 21/61* (2011.01)
*H04N 21/6379* (2011.01)

(56) References Cited

U.S. PATENT DOCUMENTS

2011/0022937 A1 1/2011 Tian et al.
2011/0142426 A1 6/2011 Sasaki et al.

FOREIGN PATENT DOCUMENTS

WO 02/085033 A2 10/2002
WO 2008/140704 A1 11/2008

OTHER PUBLICATIONS

"Notification Concerning Transmittal of International Preliminary Report on Patentability Chapter 1 of the Patent Cooperation Treaty", Jul. 10, 2014, for International Application No. PCT/US2011/067570, 7pgs.
Zhu, W. et al., "Modeling and Simulation of MPEG-2 Video Transport over ATM Networks Considering the Jitter Effect", Multimedia Signal Processing, 1997, IEEE First Workshop on Princeton, NJ, USA, Jun. 23-25, 1997, pp. 401-406, XP010233856.
"Communication re Supplementary European Search Report" dated Aug. 25, 2015 issued by the European Patent Office in EP Application No. 11878768.8, 9 pages.

* cited by examiner

METHOD OF AND APPARATUS FOR PERFORMING AN OBJECTIVE VIDEO QUALITY ASSESSMENT USING NON-INTRUSIVE VIDEO FRAME TRACKING

BACKGROUND OF THE INVENTION

Degradation of video quality may occur during and between the transmission of video signals from a transmitter to a receiver. When such degradation occurs, there may exist a need to ascertain the degree and nature of such degradation as well as to adjust the operating parameters responsible for producing the degradation.

DETAILED DESCRIPTION OF EXAMPLE EMBODIMENTS

In accordance with an exemplary and non-limiting embodiment, a method for encoding frame numbers into individual frames of a streaming video signal in a robust and nonintrusive manner is disclosed. Prior to transmission, each frame of the source video signal is encoded such as by, for example, watermarking, with information indicative of a unique frame number of the frame. When received, the encoded frame number information is decoded and utilized to perform objective video quality assessment of the received signal. The quality of the received video signal vis-à-vis the source video signal may also be utilized to perform objective video quality assessment of the received signal. In such an instance, the decoded frame number information is utilized to eliminate the occurrence of frame repetition. However computed, the results of the objective video quality assessment may be further utilized to perform optimization of parameters related to the quality of both the transmission and reception of the source video signal.

Figure 1:
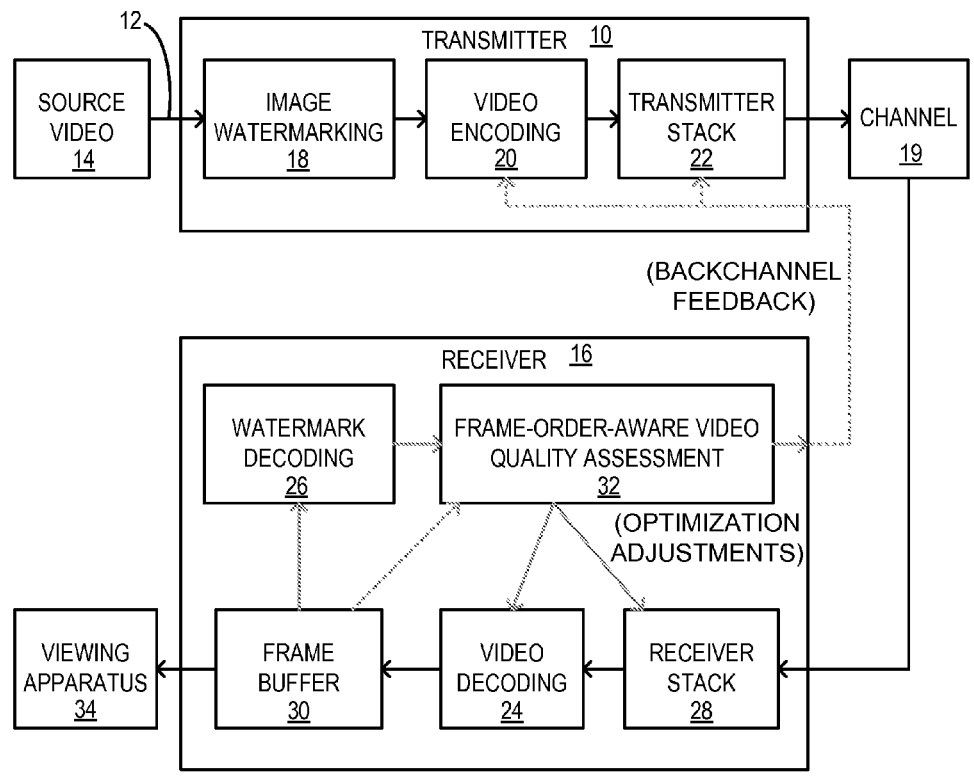
FIG. 1 is a schematic diagram of an exemplary and non-limiting embodiment.

With reference to FIG. 1, there is illustrated an overview of the video frame tracking methodology according to an exemplary embodiment. In accordance with an exemplary and non-limiting embodiment, a transmitter 10 receives a source video signal 12 from a source video 14, processes the source video signal 12 and transmits the processed signal to a receiver 16 via a channel 19. Both the transmitter 10 and the receiver 16 are illustrated in schematic fashion detailing the functions encompassed by each. As a result, for example, the logical functions comprising image watermarking module 18 and video encoding module 20 as well as transmitter stack module 22 are broadly described as forming a part of the transmitter 10. It is to be understood that in accordance with exemplary and non-limiting embodiments the transmitter 10 may utilize one or more hardware or software components, working alone or in coordinated fashion, to perform the logical functions comprising the transmitter 10.

Likewise, the logical functions comprising video decoding module 24 and watermark decoding module 26 as well as the receiver stack module 28, the frame buffer 30 and the frame-order-aware video quality assessment module 32 are broadly described as forming a part of the receiver 16. It is to be understood that exemplary and non-limiting embodiments of the receiver 16 may utilize one or more hardware or software components, working alone or in coordinated fashion, to perform the logical functions comprising the receiver 16. Further, while illustrated as separate elements, both the transmitter 10 and the receiver 16 may be implemented in the same device and may share components such as, for example, when each of the transmitter 10 and the receiver 16 are implemented as part of a unitary transceiver.

The source video 14 comprises any and all video data capable of being represented as a sequence or series of individual images or frames. As used herein, references to an "image" forming a frame of the source video 14 and the "frame" associated with such an image may be used interchangeably. The source video 14 provides an input to the transmitter 10. This input, the source video signal 12, may be communicated via either a wired or wireless mode of communication from the source video 14 to the transmitter 10. Once received by the transmitter 10, the image watermarking module 18 proceeds to watermark the image. Specifically, each image comprising source video signal 12 is digitally watermarked with encoded information indicative of a unique placement of the image with respect to the other images comprising the remaining frames of the source video 14. For example, because successive frames comprising the source video signal 12 are intended to be viewed one after the other, a first frame may be encoded with a frame number of "1", while the next frame is encoded with a frame number of "2" and so on. With regards to such an exemplary schema, it may be determined, for example, from a frame encoded with a frame number of "27" that the preceding frame was a frame encoded with the frame number "26" and that the next frame in sequence is the frame encoded with the frame number of "28".

It is known in the art to store information describing an image in a manner associated with the image. For example, a Tagged Image File Format image (ISO 12639:2004), or "TIFF" image, contains both header information and image data. The bifurcation of header data from image data allows for the inclusion of data describing the image to be placed in the header without altering, corrupting or degrading the data forming the image. There is further known in the art the process of encoding data in the image data portion of an image via digital watermarking. Digital watermarking permits the encoding of data into the image data in such a manner as to escape detection by visual inspection of the encoded image. As used herein, "watermarking" refers broadly to any and all techniques for encoding data into image data in such a manner as to escape detection by visual inspection of the encoded image.

As a result, the technique of watermarking is commonly used to prevent unwanted copying or piracy of the image. While virtually invisible to a viewer, the data encoded in the image can be decoded and read using appropriate computer software. Because the watermark is embedded in the image data, the information encoded via the watermark travels with the image data even in the event of the header data having been removed.

Furthermore, digital watermarking is robust. As used herein, "robust" refers to the ability to accurately encode in and decode information from a medium in the event that, prior to decoding, the medium in which the data is encoded is degraded. For example, it is common when viewing video over cable to experience the effects of insufficient bandwidth to allow for a high fidelity reproduction of a video signal. In such instances, it is common to experience a combination of, for example, pixilation of individual frames and the dropping of high frequency signal components. As a result of such degradation to the individual frames of the video signal, information that might be encoded in the frames might likewise be so degraded as to be unable to be accurately decoded. However, in accordance with exemplary embodiments, the use of digital watermarking to encode each image with a frame number allows for the accurate decoding of such information even in the event that any given frame is degraded.

After the image watermarking 18 of each frame with a unique frame number, the frames undergo video encoding 20. The video encoding 20 process formats the sequence of individual frames into a desired video format for transmission. Examples of video formats include, but are not limited to, such standard video formats as the Motion Pictures Expert Group (MPEG) format including MPEG-1 (ISO/IEC 11172) and related standards. As used herein, "encoding" refers to any and all manner of formatting video data to produce both compressed and uncompressed video data.

Once encoded, the video signal is stacked for transmission in accordance with a transmission protocol at a transmitter stack module 22. Examples of such protocols include, but are not limited to, Open Systems Interconnection (OSI) protocols (ITU-T Rec. X.212 [ISO/IEC 8886]), Transmission Control Protocol and Internet Protocol (TCP/IP)(RFC 1122), and IEEE 802.11 ("Wi-Fi"). In accordance with an exemplary and non-limiting embodiment, the signal is then communicated by the transmitter 10 to the channel 19. In this context, the channel 19 signifies the transfer function from the transmitter output port to the receiver input port, over which the communicated signal is transferred. The channel 19 may function as a dedicated channel, such as one amongst many cable channels, from which a desired video signal may be selected and de-multiplexed. Such a channel 19 may be transmitted in whole or in part via either wired or wireless communication means. In accordance with another exemplary and non-limiting embodiment, the transmitter 10 may transmit the video signal to the receiver 16 absent the intermediate channel 19 such as via direct wired or wireless communication.

Regardless of the mode of communication, upon reception by the receiver 16, the video signal proceeds to the receiver stack module 28 where the video signal is extracted in accordance with the communication protocol employed at the transmitter 10. The extracted signal is then decoded via video decoding module 24. Video decoding module 24 operates to decode the individual frames of the received video signal and to store each frame, one at a time, in the frame buffer 30. The frame buffer 30 comprises a portion of computer memory of a size sufficient to store at least a single frame in the native resolution of the source video signal. Once an individual frame of a sequence of frames comprising the video signal is decoded and stored in the frame buffer 30, the frame buffer is transmitted to a viewing apparatus 34. The viewing apparatus 34 is any apparatus capable of receiving and displaying image data including, but not limited to, a television, a computer monitor, a mobile phone display and the like. For example, when the viewing apparatus 34 is a computer monitor receiving a signal from a graphics card operating in accordance with instructions issued in Open Graphics Library (OpenGL) commands, the process of flashing the contents of the frame buffer 30 to the viewing apparatus 34 is known as "blitting."

In parallel to providing the contents of the frame buffer 30 to the viewing apparatus 34, the data comprising each image in the frame buffer 30 is communicated to watermark decoding module 26. Specifically, each image comprising each frame of the video signal undergoes decoding to extract the information encoded in the frame at the image watermarking module 18. Specifically, the frame numbers encoded in each frame by the transmitter 10 are decoded to produce a sequence of frame numbers indicative of the order in which frames were communicated to the frame buffer 30 and further to the viewing apparatus 34. While watermark decoding module 26 is illustrated herein as receiving input from frame buffer 30, alternative exemplary embodiments are broadly drawn to encompass the reception of input data by watermark decoding module 26 at any point during the encoding and transmission of the video signal.

It is known in the art to perform an objective video quality assessment on a video stream. Objective video quality assessment involves employing techniques comprising mathematical models that approximate results of subjective quality assessment, but are based on criteria and metrics that can be measured objectively and automatically evaluated by a computer program. Objective methods are classified based on the availability of the original video signal, which is considered to be of high quality (generally not compressed). Therefore, they can be classified as Full Reference Methods (FR), Reduced Reference Methods (RR) and No-Reference Methods (NR). FR metrics compute the quality difference by comparing every pixel in each image of the distorted video to its corresponding pixel in the original video. RR metrics extract some features of both videos and compare them to give a quality score. They are used when all the original video is not available, e.g. in a transmission with a limited bandwidth. NR metrics try to assess the quality of a distorted video without any reference to the original video.

Research performed when developing Intel's Gross Error Detection (GED) Methodology discovered a correlation between the degree of frame order corruption and the subjective Mean Opinion Score (MOS). As a result, much like known objective video quality assessment techniques, knowledge of frame order and attendant frame order corruption may be utilized to approximate subjective video quality assessments.

With this fact in mind, in an exemplary and non-limiting embodiment, the sequence of decoded frame numbers from the watermark decoding 26 is communicated to the frame-order-aware video quality assessment module 32. Specifically, as each frame number is decoded at the watermark decoding module 26, the sequence of decoded frame numbers is analyzed to perform an objective video quality assessment. In an exemplary embodiment, the sequence of decoded frame numbers forms the only input to the frame-order-aware video quality assessment 32.

In accordance with other exemplary and non-limiting embodiments, one or more images are communicated from the frame buffer 30 to the frame-order-aware video quality assessment module 32 and utilized to perform, for example, full reference, reduced reference and no-reference objective video quality assessment. The communication of such image data is illustrated as a dotted line extending from the frame buffer 30 to the frame-order-aware video quality assessment module 32. In such an instance, a hybrid methodology is employed whereby the frame-order-aware video quality assessment module 32 disclosed herein incorporates inputs comprising, at least, one or more images from the frame buffer 30. In an exemplary embodiment, frame order corruption data is utilized to affect the manner in which individual frames are observed to compute an objective metric of video quality. For example, if the watermark decoding module 26 determines that a frame is repeated, the identified repeated frame will not be included in the objective metric computation so that the video sequence of frames is kept in synch with any reference information that may be used in the computation of the objective metric of video quality.

The output of the frame-order-aware video quality assessment module 32 may be used to adaptively adjust the operating parameters of modules in the receiver 16 and/or the transmitter 10. For example, if frame deletions occurring due to buffer overruns at the frame buffer 30 are found to be a frequent occurrence, the size of the frame buffer 34 may be increased to reduce the incidence of such frame buffer 30 overruns. In accordance with an exemplary embodiment, back channel feedback may be provided to one or more modules of the transmitter 10 to adaptively adjust the operating parameters of modules in the transmitter 10. This back channel feedback is illustrated by dotted lines extending from the frame-order-aware video quality assessment module 32 to various modules of the transmitter 10. For example, if the frame-order-aware video quality assessment module 32 determines that frames are being dropped at a sufficiently high rate, the frame-order-aware video quality assessment module 32 may instruct the video encoding module 20 to, for example, increase the latency of transmissions, increase the level of frame compression and the like.

Figure 2:
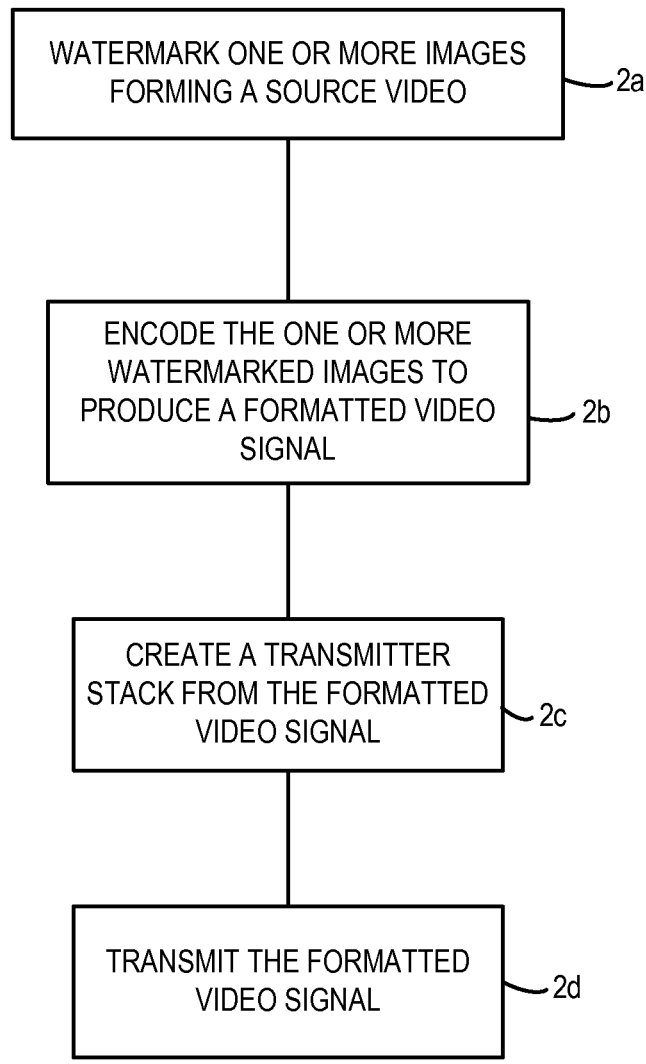
FIG. 2 is a flow diagram of a method according to an exemplary and non-limiting embodiment.

With reference to FIG. 2, there is illustrated a flow diagram of a method of image watermarking according to an exemplary and non-limiting embodiment. At step 2a, each of one or more images forming a source video is watermarked. Specifically, as described in detail above, a source video signal 12 is received by a transmitter. The component frames, or images, comprising the source video signal 12, are individually watermarked with a frame sequence number to indicate the placement of each watermarked frame in the sequence of frames comprising the source video signal 12.

At step 2b, the one or more watermarked images are encoded to produce a formatted video signal. As described above, in exemplary embodiments the video signal may be encoded into a standard format, such as MPEG. Next, at step 2c, a transmitter stack is formed from the formatted video signal that is compliant with the communication protocol to be used in the transmission of the formatted video signal. Lastly, at step 2d, the formatted video signal is transmitted.

As described above, the transmission from the transmitter 10 to the receiver 16 may be via a wired communication link, a wireless communication link, or may even involve the transfer of data between separate modules or components of the same device.

Figure 3:
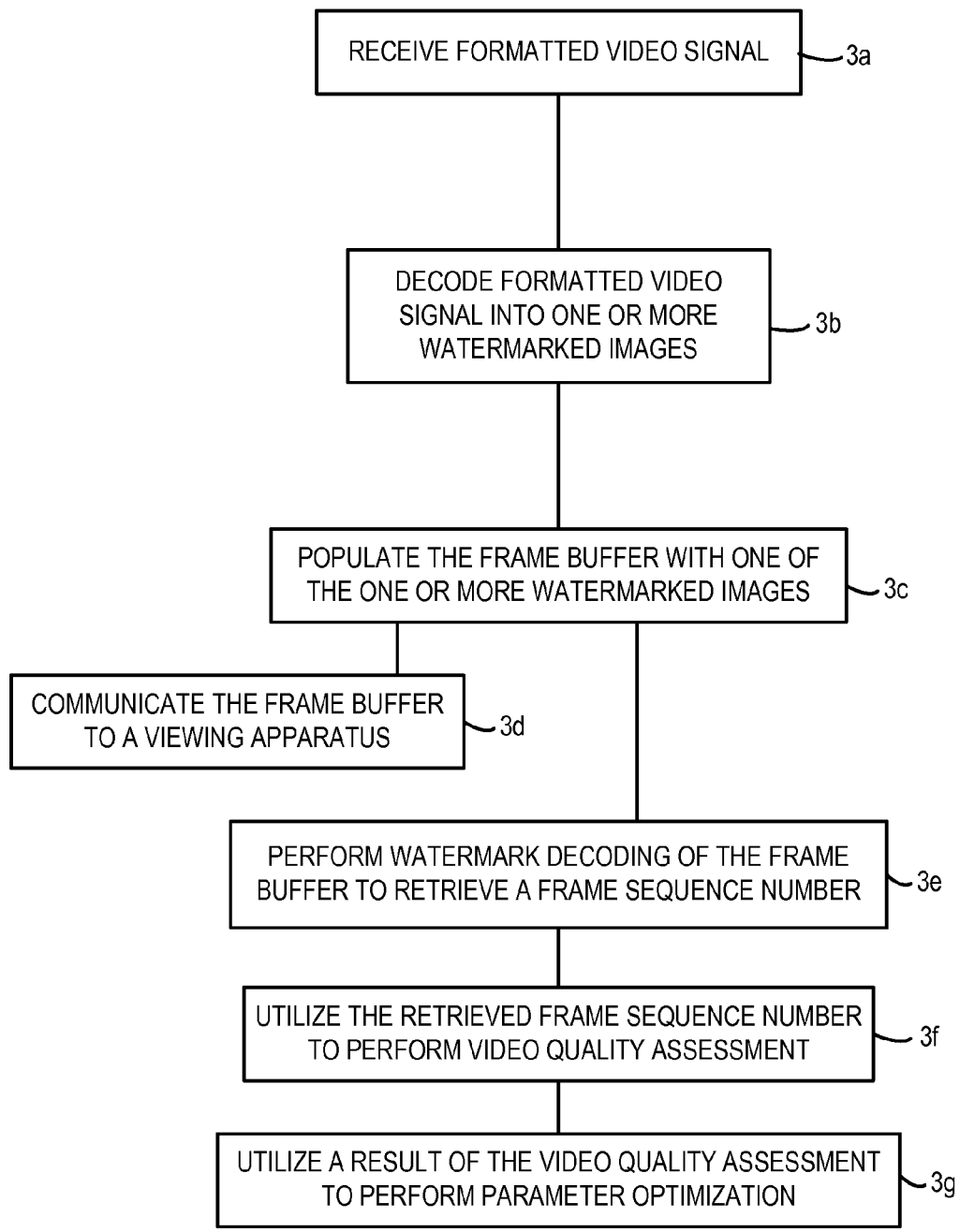
FIG. 3 is a flow diagram of a method according to an exemplary and non-limiting embodiment.

With reference to FIG. 3, there is illustrated a flow diagram of a method of receiving and decoding a watermarked video signal according to an exemplary and non-limiting embodiment. At step 3a, a formatted video signal is received. At step 3b, the formatted video signal is decoded to derive the one or more watermarked images each forming a frame of the formatted video signal. Once decoded, at step 3c the frame buffer 30 is populated with one of the one or more watermarked images. Once populated, at step 3d the contents of the frame buffer are communicated, such as by "blitting", to a viewing apparatus 34. In parallel fashion, at step 3e watermark decoding is performed on the contents of the frame buffer to retrieve the frame sequence number associated with the image in the frame buffer 30.

At step 3f, each retrieved frame number sequence is utilized to perform a video quality assessment of the received formatted video signal. Lastly, at step 3g, the results of the video quality assessment are utilized to perform parameter optimization both at the transmitter 10 and the receiver 16.

Figure 4:
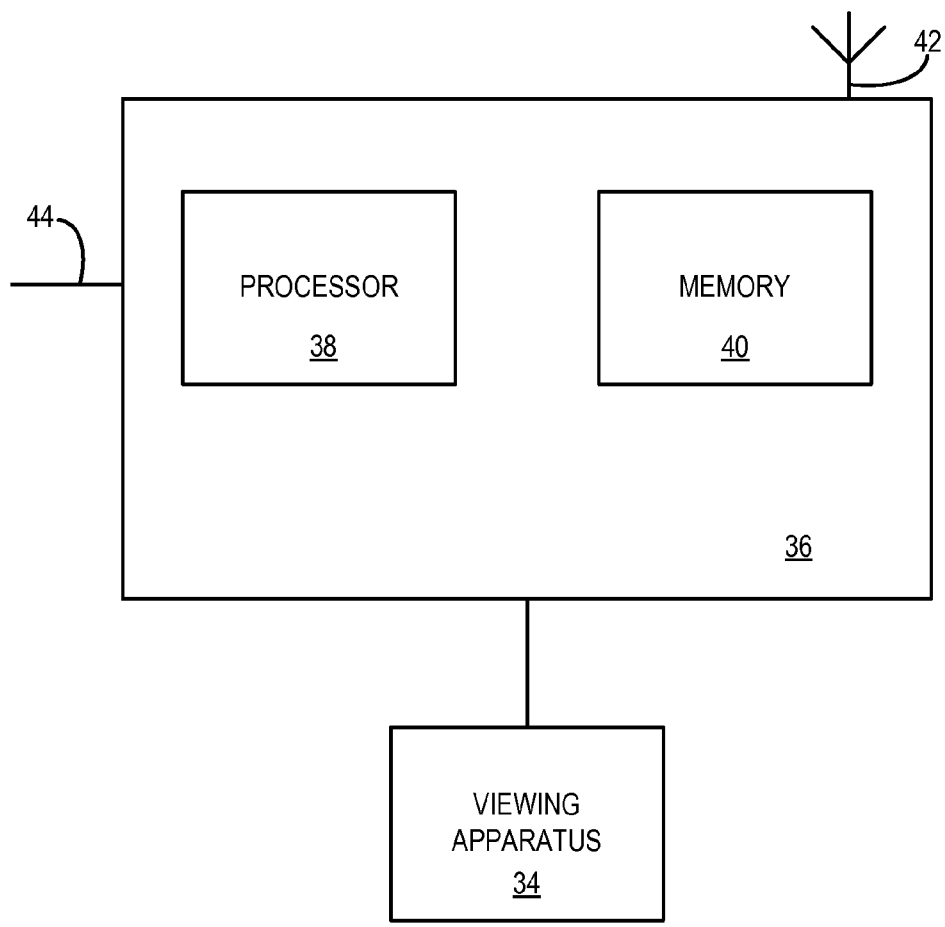
FIG. 4 is a block diagram of a system according to an exemplary and non-limiting embodiment.

With reference to FIG. 4, there is illustrated a device 36 in accordance with exemplary embodiments disclosed herein. The device 36 includes a processor 38 according to any of the embodiments described herein. For example, the processor 38 might be comprised of a host processor, a co-processor, and/or a memory unit for storing instructions and/or data required to perform any of the functions of any of the modules described above with respect to both the transmitter 10 and the receiver 16. In addition to an internal memory, the processor 38 may additionally be in communication with the memory 40 comprised of, for example, RAM memory for storing instruction and/or data such, for example, the frame buffer 30.

As illustrated, device 36 is capable of functioning as the transmitter 10 and/or the receiver 16. Device 36 comprises at least one input 44 for receiving both source video signal 12 and/or a video signal broadcast by the transmitter 10. Device 36 may likewise comprise an output 46 for communicating a signal, such as one comprising the contents of the frame buffer 30, to a viewing apparatus 34. Device 36 may likewise comprise a communication means 42. Communication means 42 may be, for example, an antenna or a wired communication link for transmitting and/or receiving, for example, backchannel feedback information or a video signal.

Figure 5:
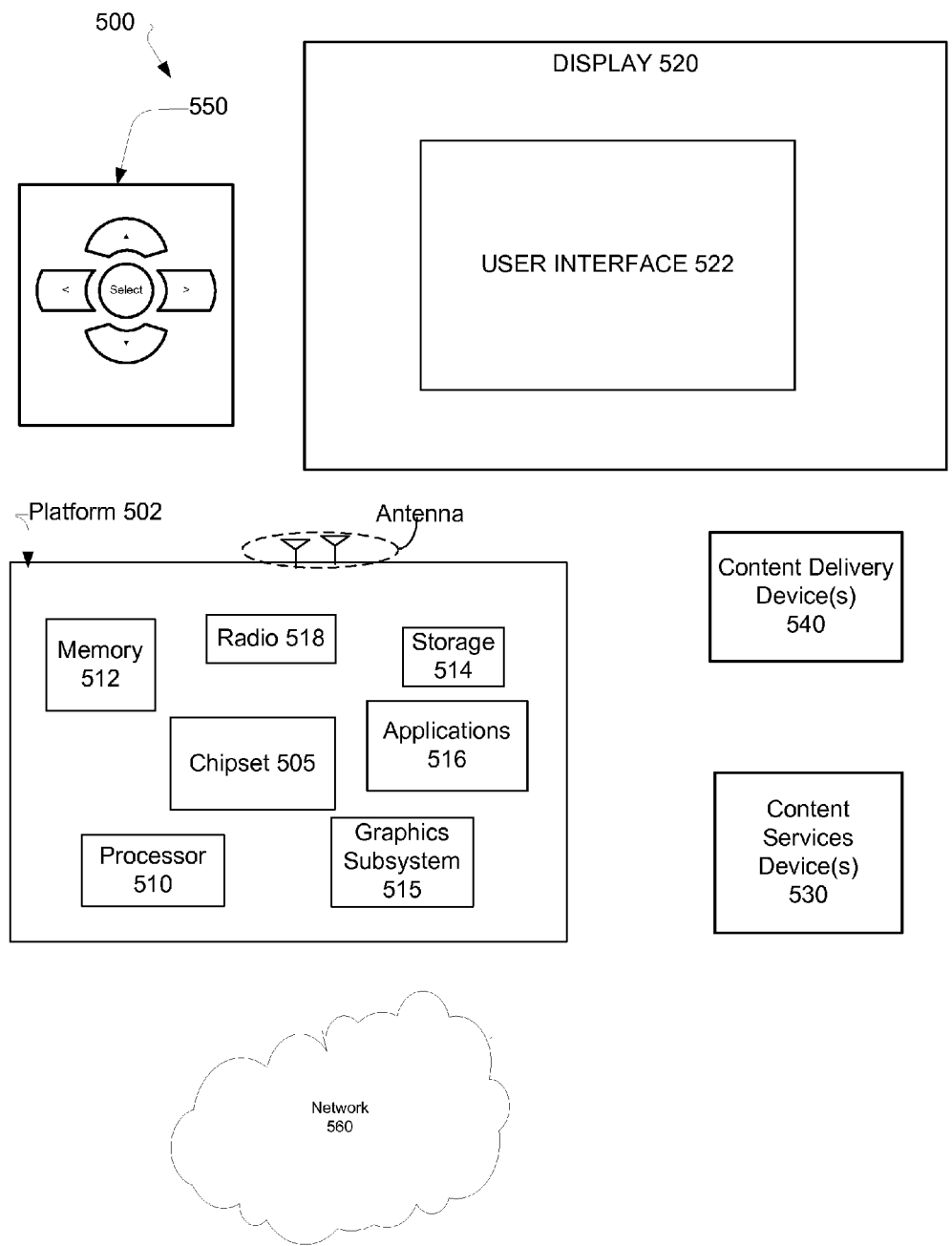
FIG. 5 illustrates another system in accordance with some embodiments.

FIG. 5 illustrates an embodiment of a system 500. In embodiments, system 500 may be a media system although system 500 is not limited to this context. For example, system 500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 500 comprises a platform 502 coupled to a display 520. Platform 502 may receive content from a content device such as content services device(s) 530 or content delivery device(s) 540 or other similar content sources. A navigation controller 550 comprising one or more navigation features may be used to interact with, for example, platform 502 and/or display 520. Each of these components is described in more detail below.

In embodiments, platform 502 may comprise any combination of a chipset 505, processor 510, memory 512, storage 514, graphics subsystem 515, applications 516 and/or radio 518. Chipset 505 may provide intercommunication among processor 510, memory 512, storage 514, graphics subsystem 515, applications 516 and/or radio 518. For example, chipset 505 may include a storage adapter (not depicted) capable of providing intercommunication with storage 514.

Processor 510 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 510 may comprise dual-core processor(s), dual-core mobile processor(s), and so forth.

Memory 512 may be implemented as a volatile memory device such as, but not limited to, a Random Access Memory (RAM), Dynamic Random Access Memory (DRAM), or Static RAM (SRAM).

Storage 514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 514 may comprise technology to increase the storage performance enhanced protection for valuable digital media when multiple hard drives are included, for example.

Graphics subsystem 515 may perform processing of images such as still or video for display. Graphics subsystem 515 may be a graphics processing unit (GPU) or a visual processing unit (VPU), for example. An analog or digital interface may be used to communicatively couple graphics subsystem 515 and display 520. For example, the interface may be any of a High-Definition Multimedia Interface, DisplayPort, wireless HDMI, and/or wireless HD compliant techniques. Graphics subsystem 515 could be integrated into processor 510 or chipset 505. Graphics subsystem 515 could be a stand-alone card communicatively coupled to chipset 505.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 518 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 518 may operate in accordance with one or more applicable standards in any version.

In embodiments, display 520 may comprise any television type monitor or display. Display 520 may comprise, for example, a computer display screen, touch screen display, video monitor, television-like device, and/or a television. Display 520 may be digital and/or analog. In embodiments, display 520 may be a holographic display. Also, display 520 may be a transparent surface that may receive a visual projection. Such projections may convey various forms of information, images, and/or objects. For example, such projections may be a visual overlay for a mobile augmented reality (MAR) application. Under the control of one or more software applications 516, platform 502 may display user interface 522 on display 520.

In embodiments, content services device(s) 530 may be hosted by any national, international and/or independent service and thus accessible to platform 502 via the Internet, for example. Content services device(s) 530 may be coupled to platform 502 and/or to display 520. Platform 502 and/or content services device(s) 530 may be coupled to a network 560 to communicate (e.g., send and/or receive) media information to and from network 560. Content delivery device(s) 540 also may be coupled to platform 502 and/or to display 520.

In embodiments, content services device(s) 530 may comprise a cable television box, personal computer, network, telephone, Internet enabled devices or appliance capable of delivering digital information and/or content, and any other similar device capable of unidirectionally or bidirectionally communicating content between content providers and platform 502 and/display 520, via network 560 or directly. It will be appreciated that the content may be communicated unidirectionally and/or bidirectionally to and from any one of the components in system 500 and a content provider via network 560. Examples of content may include any media information including, for example, video, music, medical and gaming information, and so forth.

Content services device(s) 530 receives content such as cable television programming including media information, digital information, and/or other content. Examples of content providers may include any cable or satellite television or radio or Internet content providers. The provided examples are not meant to limit embodiments of the invention.

In embodiments, platform 502 may receive control signals from navigation controller 550 having one or more navigation features. The navigation features of controller 550 may be used to interact with user interface 522, for example. In embodiments, navigation controller 550 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 550 may be echoed on a display (e.g., display 520) by movements of a pointer, cursor, focus ring, or other visual indicators displayed on the display. For example, under the control of software applications 516, the navigation features located on navigation controller 550 may be mapped to virtual navigation features displayed on user interface 522, for example. In embodiments, controller 550 may not be a separate component but integrated into platform 502 and/or display 520. Embodiments, however, are not limited to the elements or in the context shown or described herein.

In embodiments, drivers (not shown) may comprise technology to enable users to instantly turn on and off platform 502 like a television with the touch of a button after initial boot-up, when enabled, for example. Program logic may allow platform 502 to stream content to media adaptors or other content services device(s) 530 or content delivery device(s) 540 when the platform is turned "off." In addition, chip set 505 may comprise hardware and/or software support for 5.1 surround sound audio and/or high definition 5.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 500 may be integrated. For example, platform 502 and content services device(s) 530 may be integrated, or platform 502 and content delivery device(s) 540 may be integrated, or platform 502, content services device(s) 530, and content delivery device(s) 540 may be integrated, for example. In various embodiments, platform 502 and display 520 may be an integrated unit. Display 520 and content service device(s) 530 may be integrated, or display 520 and content delivery device(s) 540 may be integrated, for example. These examples are not meant to limit the invention.

In various embodiments, system 500 may be implemented as a wireless system, a wired system, or a combination of both. When implemented as a wireless system, system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
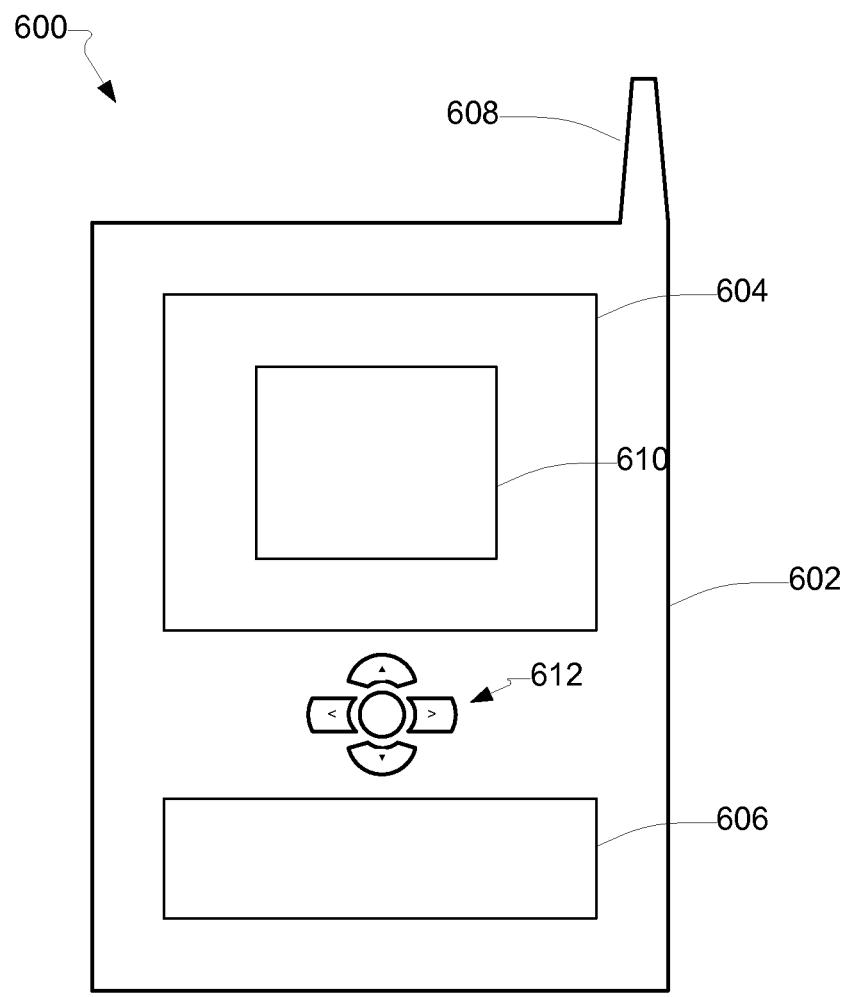
FIG. 6 is an example of a small form factor device in accordance with some embodiments.

As described above, system 500 may be embodied in varying physical styles or form factors. FIG. 6 illustrates embodiments of a small form factor device 600 in which system 500 may be embodied. In embodiments, for example, device 600 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 600 may comprise a housing 602, a display 604, an input/output (I/O) device 606, and an antenna 608. Device 600 also may comprise navigation features 612. Display 604 may comprise any suitable display unit for displaying information appropriate for a mobile computing device. I/O device 606 may comprise any suitable I/O device for entering information into a mobile computing device. Examples for I/O device 606 may include an alphanumeric keyboard, a numeric keypad, a touch pad, input keys, buttons, switches, rocker switches, microphones, speakers, voice recognition device and software, and so forth. Information also may be entered into device 600 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various modifications and changes may be made to the foregoing embodiments without departing from the broader spirit and scope set forth in the appended claims. The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

What is claimed is:

1. A method comprising:
    receiving a formatted video signal;
    decoding the formatted video signal into one or more watermarked images;
    populating a frame buffer with one of the one or more watermarked images;
    providing the one of the one or more watermarked images in the frame buffer, in parallel, to (i) a viewing apparatus and (ii) a watermark decoding module for decoding the one of the one or more watermarked images to retrieve a unique watermarked frame sequence number;

performing video quality assessment based, at least in part, upon the unique watermarked frame sequence number; and based on an output of the video quality assessment, adaptively adjusting a size of the frame buffer.

2. The method of claim 1 wherein performing the video quality assessment further comprises comparing the unique watermarked frame sequence number to at least one previously decoded unique watermarked frame sequence number.

3. The method of claim 2 wherein performing the video quality assessment further comprises utilizing a contents of the frame buffer.

4. The method of claim 3 wherein utilizing the contents of the frame buffer comprises disregarding the contents of the frame buffer if the unique watermarked frame sequence number decoded from the frame buffer is repetitive of a previously decoded unique watermarked frame sequence number.

5. The method of claim 1 further comprising:
performing parameter optimization based, at least in part, upon a result of the video quality assessment wherein performing the parameter optimization further comprises adjusting at least one parameter related to the decoding of the formatted video signal.

6. The method of claim 1 further comprising:
performing parameter optimization based, at least in part, upon a result of the video quality assessment wherein performing the parameter optimization further comprises increasing the size of the frame buffer.

7. The method of claim 1 further comprising:
performing parameter optimization based, at least in part, upon a result of the video quality assessment wherein performing the parameter optimization further comprises optimizing parameters related to a transmission of the formatted video signal.

8. The method of claim 7 wherein optimizing parameters related to a transmission of the formatted video signal is accomplished via backchannel feedback.

9. The method of claim 1 wherein each unique watermarked frame sequence number indicates a unique placement of one of the plurality of watermarked images with respect to the other watermarked images.

10. The method of claim 1 wherein the one or more watermarked images watermarked each includes a respective digital watermark comprising a unique watermarked frame sequence number.

11. A system, comprising:
an antenna; and
an apparatus coupled to the antenna and including a computer readable medium having stored thereon instructions which, when executed by a processor, cause the processor to:
receive a formatted video signal via the antenna;
decode the formatted video signal into one or more watermarked images;
populate a frame buffer with one of the one or more watermarked images;
provide the one of the one or more watermarked images in the frame buffer, in parallel, to (i) a viewing apparatus and (ii) a watermark decoding module for decoding the one of the one or more watermarked images to retrieve a unique watermarked frame sequence number;
perform video quality assessment based, at least in part, upon the unique watermarked frame sequence number; and
based on an output of the video quality assessment, adaptively adjusting a size of the frame buffer.

12. The system of claim 11 wherein when performing the video quality assessment the instructions further cause the processor to compare the unique watermarked frame sequence number to at least one previously decoded unique watermarked frame sequence number.

13. The system of claim 11 wherein when performing the video quality assessment the instructions further cause the processor to utilize a contents of the frame buffer.

14. The system of claim 13 wherein when utilizing the contents of the frame buffer the instructions further cause the processor to disregard the contents of the frame buffer if the unique watermarked frame sequence number decoded from the frame buffer is repetitive of a previously decoded unique watermarked frame sequence number.

15. The system of claim 11 further comprising instructions which, when executed by a processor, cause the processor to:
perform parameter optimization based, at least in part, upon a result of the video quality assessment wherein when performing the parameter optimization the instructions further cause the processor to adjust at least one parameter related to the decoding of the formatted video signal.

16. The system of claim 11 further comprising instructions which, when executed by a processor, cause the processor to:
perform parameter optimization based, at least in part, upon a result of the video quality assessment wherein when performing the parameter optimization the instructions further cause the processor to increase the size of the frame buffer.

17. The system of claim 11 further comprising instructions which, when executed by a processor, cause the processor to:
perform parameter optimization based, at least in part, upon a result of the video quality assessment wherein when performing the parameter optimization the instructions further cause the processor to optimize parameters related to a transmission of the formatted video signal.

18. The system of claim 17 wherein the optimizing parameters related to a transmission of the formatted video signal is accomplished via backchannel feedback.

19. The method of claim 11 wherein the one or more watermarked images watermarked each includes a respective digital watermark comprising a unique watermarked frame sequence number.

* * * * *